United States Patent [19]

Dell-Imagine et al.

[11] Patent Number: 4,962,488

[45] Date of Patent: Oct. 9, 1990

[54] TECHNIQUE FOR SURFACE TO SURFACE COMMUNICATIONS USING HIGH FREQUENCY RADIO WITH LOW PROBABILITY OF INTERCEPT SIGNALING

[75] Inventors: Robert A. Dell-Imagine, Orange; Millard J. Parrish, Fountain Valley; John A. Carnaghie, Cerritos, all of Calif.

[73] Assignee: Hughes Aircraft Company, Los Angeles, Calif.

[21] Appl. No.: 304,543

[22] Filed: Jan. 31, 1989

[51] Int. Cl.$^5$ .............................................. H04B 1/59
[52] U.S. Cl. ........................................... 367/3; 367/4; 343/709; 441/11
[58] Field of Search ........................ 367/2, 3, 4, 5, 77; 343/709, 893; 441/11, 21, 30

[56] References Cited

U.S. PATENT DOCUMENTS

| | | | |
|---|---|---|---|
| 3,867,710 | 2/1975 | Busignies | 340/4 R |
| 3,903,497 | 9/1975 | Stimler et al. | 367/4 |
| 3,933,109 | 1/1976 | Boisrayon et al. | 114/16.5 |
| 3,946,391 | 3/1976 | Cuckler et al. | 343/709 |
| 3,972,046 | 7/1976 | Lombardi | 343/709 |
| 3,986,159 | 10/1976 | Horn | 340/2 |
| 4,052,703 | 10/1977 | Collins, Sr. et al. | 364/200 |
| 4,086,504 | 4/1978 | Ezell et al. | 367/77 |
| 4,089,209 | 5/1978 | Grana et al. | 73/61 R |
| 4,093,934 | 6/1978 | Urick et al. | 340/2 |
| 4,110,726 | 8/1978 | Dorrance | 340/6 R |
| 4,186,370 | 1/1980 | Cupolo et al. | 367/4 |
| 4,203,109 | 5/1980 | Ballard et al. | 340/850 |
| 4,203,160 | 5/1980 | Doherty | 367/2 |
| 4,291,409 | 9/1981 | Weinberg et al. | 375/1 |
| 4,336,537 | 6/1982 | Strickland | 340/850 |
| 4,473,896 | 9/1984 | Loeser et al. | 367/4 |
| 4,639,900 | 1/1987 | Gustafson | 367/5 |
| 4,665,404 | 5/1987 | Christy et al. | 342/463 |
| 4,668,200 | 5/1987 | Kotoh et al. | 441/7 |
| 4,755,943 | 7/1988 | Barnay | 364/420 |

Primary Examiner—Ian J. Lobo
Attorney, Agent, or Firm—Wanda K. Denson-Low

[57] ABSTRACT

A high frequency (HF) communications buoy that employs HF surface wave, and sky wave, communication and spread spectrum modulation to suppress multipath fading and to decrease the undesired detectability of transmitted signals. The buoy comprises a water-tight floatable enclosure that may be deployed from a flying vehicle or a submerged vessel. An HF communications transceiver is disposed within the enclosure that is capable of transmitting and receiving signals employing high frequency (HF) band surface wave and sky wave propagation. The transceiver further comprises spread spectrum modulation and demodulation circuitry for modulating transmitted signals utilizing spread spectrum modulation and for demodulating received signals encoded by means of spread spectrum modulation. The spread spectrum modulation and demodulation circuitry is provided to suppress multipath fading and decrease the probability of detection of transmitted signals. An antenna is coupled to the transceiver and supports the transmission and reception of the high frequency (HF) spread spectrum modulated signals. The use of HF surface wave communications in conjunction with the spread spectrum modulation of the transmitted signals provides for networking of a plurality of buoys. The use of HF spread spectrum communications also reduces the probability of exposing the presence and location of the transmitting terminal and eliminates multipath interference between ground wave and sky wave transmissions, or transmissions reflected from different sky wave layers. In addition, utilization of the underwater communication circuitry permits a submerged vehicle to take advantage of the relatively secure communications link provided by the present invention.

9 Claims, 1 Drawing Sheet

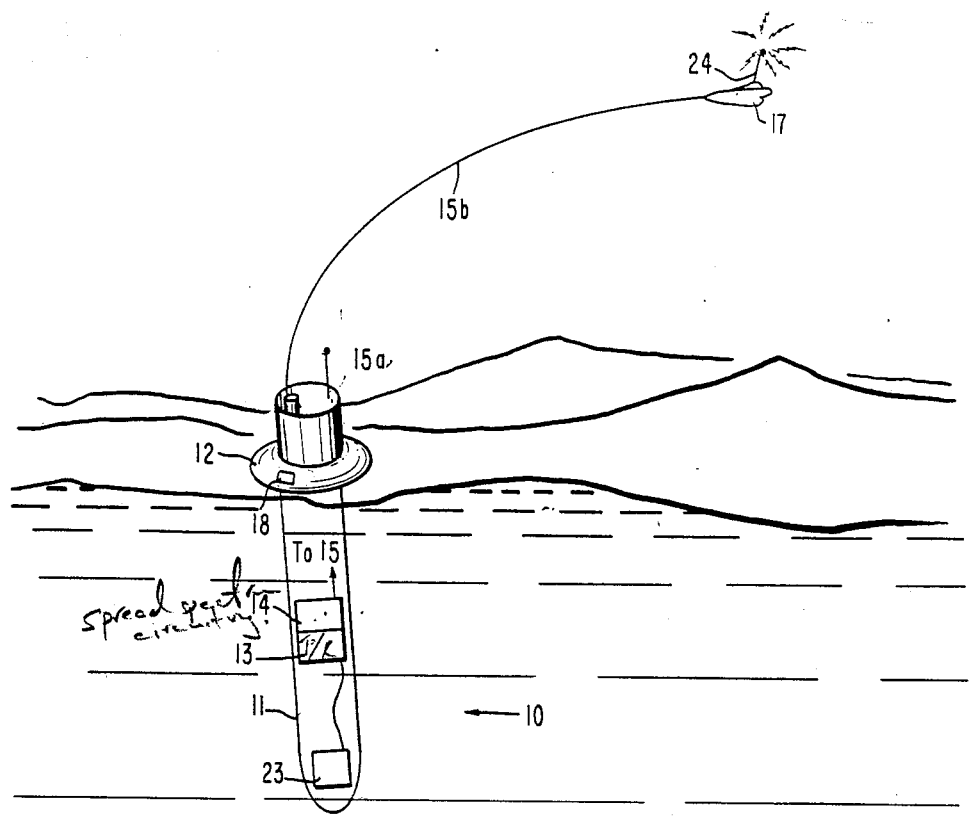
Fig. 1.
Fig. 2.
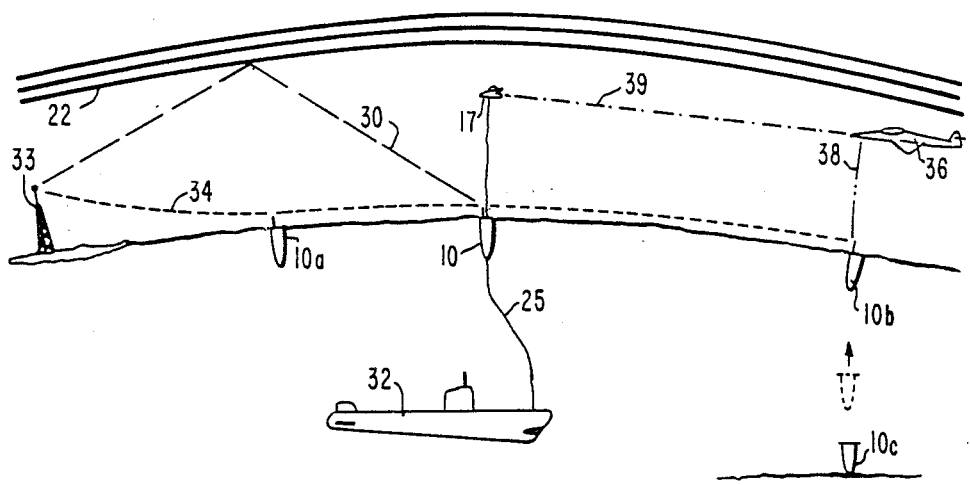

TECHNIQUE FOR SURFACE TO SURFACE COMMUNICATIONS USING HIGH FREQUENCY RADIO WITH LOW PROBABILITY OF INTERCEPT SIGNALING

BACKGROUND

The present invention relates generally to communications buoys and communications systems that utilize such buoys, and more particularly to a high frequency (HF) surface to surface communications buoy that employs spread spectrum modulation.

Conventional communications buoys, commonly known as sonobuoys, utilize ultra high frequency (UHF) radio communications. One current UHF sonobuoy system is manufactured by Magnavox. Such UHF communications sonobuoys are limited to line of sight communications paths between the sonobuoy transmitter and a receiver platform, such as a ship or an aircraft. Such conventional sonobuoy links require an airborne relay between the transceiver and the distant terminal. Typically, an aircraft flies in the vicinity of the buoy and relays messages transmitted by the buoy to remote locations. As such, conventional sonobuoy systems do not permit their use in networked, multiple hop relay systems, for example.

In addition, a number of U.S. Patents disclose technology relating to buoy communications systems, line of sight HF communications systems and spread spectrum communications systems. The following are illustrative of conventional systems.

U.S. Pat. No. 4,336,537 for "Bi-Directional Underwater Communication System," issued to Strickland discloses a system wherein a submerged operator can communicate with a surface site. The operator uses a facemask-mounted microphone and an earphone connected to a submerged watertight radio. An antenna is carried by a buoy to the surface of the body of water in which the operator is submerged to provide a communication path for the operator. The submerged radio is disclosed to be a PRC-77 radio, which operates in the 2-70 MHZ band, which encompasses the HF bandwidth utilized in the present invention. However, nothing whatsoever is disclosed regarding the operation of the radio, including either surface wave or sky wave propagation modes, or of the use of spread spectrum encoding of the HF signals. This patent discloses a line of sight communications system which permits communication from the submerged operator to a vessel on the surface, or a surface control craft, for example.

U.S. Pat. No. 4,203,109 for "Submarine Communication System," issued to Ballard et al discloses a method and apparatus for communicating information between a submerged vessel and an aircraft, for example. The communications is achieved by means of an expendable cable link between the vessel and the surface. A buoy is attached to the cable link and contains a transmitter and a receiver which is released from the submerged vessel and floats on the surface. The cable link provides electrical and power leads between the submerged vessel and the buoy. The communications is accomplished by conventional RF radio transmissions. Nothing whatsoever is disclosed in this patent regarding the use of HF sky wave or surface wave propagation or the use of spread spectrum encoding of the HF signals.

U.S. Pat. No. 3,946,391 for "Buoy Antenna System," issued to Cuckler et al discloses an expendable marker buoy which includes an RF transmitter and antenna arrangement enclosed within the buoy enclosure. The design is such that a antenna is coupled by way of a dielectric material to the water which acts as a ground plane for the antenna.

U.S. Pat. No. 4,203,160 for "Submarine Communication," issued to Doherty discloses a communication system wherein a very low frequency (VLF) communication link is established between a relay ship or a relay drone, and from the ship or drone to a submarine by way of an acoustic link. Mention is made that communications can be made by way of an RF, MF, HF or UHF communication link employed at the relay station or in the drone. However, no description of the particular equipment or operation of HF equipment is disclosed. In addition, there is no mention of HF surface wave or sky wave propagation or the use of spread spectrum encoding of HF signals.

U.S. Pat. No. 4,639,900 entitled "Method and a System for Monitoring a Sea Area," issued to Gustafson, discloses a system wherein listening devices are employed to monitor the sea area. Transmitters coupled to the listening device utilize channelized HF to communicate to master monitoring station. His communication system employs direct line of sight HF communications and nothing is disclosed or suggested regarding the use of surface or sky wave propagation or spread spectrum modulation.

U.S. Pat. No. 4,291,409 entitled "Spread Spectrum Communications Method and Apparatus," issued to Weinberg et al, discloses a wide bandwidth communications system employing spread spectrum techniques. Buoy transmitters are employed in a direct line of sight communications link to synchronously orbiting satellites. The satellites relay the transmitted information to a base station located on land. As in the previously discussed patents, nothing is disclosed regarding the use of HF surface or sky wave communications or the combining of spread spectrum techniques with such HF surface or sky wave communications equipment.

SUMMARY OF THE INVENTION

In order to overcome the limitations of conventional UHF communications buoys, and particularly their line of sight requirements and non-networkability, the present invention provides for a high frequency (HF) communications buoy, which employs HF surface wave and sky wave communication capability incorporating spread spectrum modulation to suppress multipath fading and to decrease the undesired detectability of transmitted signals.

In particular, the present invention comprises HF band, spread spectrum modulated communications apparatus in a buoy enclosure that permits communication from the ocean surface to compatible communication apparatus located beyond the local horizon. The apparatus comprises a water-tight floatable enclosure that may be deployed from a flying vehicle, or a surface vessel, or a submerged vessel. An HF communications transceiver is disposed within the enclosure that is capable of transmitting and receiving signals employing high frequency (HF) band surface wave and sky wave propagation. The transceiver further comprises spread spectrum modulation and demodulation circuitry for modulating transmitted signals utilizing spread spectrum modulation and for demodulating received signals encoded by means of spread spectrum modulation. The spread spectrum modulation and demodulation circuitry is provided to suppress multipath fading and decrease the probability of detection of transmitted signals. One or more antennas are coupled to the transceiver and support the transmission and reception of the high frequency (HF) spread spectrum modulated signals using surface wave and/or sky wave propagation modes.

In addition the apparatus may also include underwater communication circuitry coupled to the transceiver for providing a communication link to a submerged vessel or vessels. This provides a means by which the submerged vessel can utilize HF surface or sky wave communications to communicate to distant terminals. The apparatus generally includes a sensor which senses when the apparatus is floating on the surface of the ocean, and which provides a signal which triggers the deployment of the antenna. The sensor may be an immersion sensor if the buoy is deployed from a flying or surface vehicle, or a surface sensor if the buoy is deployed from a submerged vehicle.

The antenna may comprise a spring loaded hydrophobically coated extendible wire antenna, or a flexible wire antenna including an inflatable aerodynamic lifting body coupled thereto for erecting the wire antenna to a predetermined height above the ocean surface and for maintaining the wire antenna in a nearly vertical orientation, optimizing surface wave propagation. In addition, if the flexible wire antenna arrangement is employed, a line of sight RF transceiver may be attached to the inflatable aerodynamic lifting body and erected therewith to provide a low power, short distance, line of sight microwave radio frequency communications link isolated from surface effects such as spume and spray, and the like. In this case, the flexible wire antenna comprises a multiconductor antenna which includes an HF antenna, and direct current power lines and an intermediate frequency (IF) line coupled to the line of sight RF transceiver.

The underwater communication circuitry may comprise a fiber optic tether coupled between the HF transceiver and an submerged vessel. This provides a communication link to the submerged vessel and a means by which the vessel can utilize the HF communications apparatus to communicate with remote terminals. In the alternative, the underwater communication circuitry may comprise a blue-green laser communications system optically coupled between the HF transceiver and the submerged vessel. This provides an optical communication link to the vessel. As another alternative, the underwater communication circuitry may comprise an acoustic energy communication system coupled to the transceiver means which provides an acoustic communication link between the submerged vessel and the HF communications apparatus.

The present invention thus comprises an HF radio in a sonobuoy package to communicate from the surface of the ocean to other terminals beyond the horizon. The heart of the invention comprises the use of surface wave, and secondarily sky wave, HF propagation to communicate to other buoys and/or other terrminals located beyond the horizon, and the use of spread spectrum modulation to suppress multipath fading and to decrease the detectability of the transmitted signals. The inclusion of the RF radio located in the erectable antenna arrangement provides for a low probability of intercept relay link to a an airborne platform.

The use of HF communications in conjunction with the spread spectrum modulation of the transmitted signals provides for networking of a plurality of buoys. In addition, utilization of the underwater communication circuitry permits a submerged vehicle to take advantage of the relatively secure communications link provided by the present invention. The use of HF spread spectrum communications also reduces the probability of exposing the presence and location of the transmitting terminal and mitigates multipath interference between ground wave and sky wave transmissions, or transmissions reflected from different sky wave layers.

BRIEF DESCRIPTION OF THE DRAWING

The various features and advantages of the present invention may be more readily understood with reference to the following detailed description taken in conjunction with the accompanying drawing, wherein like reference numerals designate like structural elements, and in which:

FIG. 1 illustrates an HF communications buoy in accordance with the principles of the present invention; and FIG. 2 illustrates a variety of operational embodiments of the HF communications buoy of the present invention.

DETAILED DESCRIPTION

With reference to FIG. 1, an HF communications buoy 10 in accordance with the principles of the present invention is shown. The HF communications buoy 10 comprises a floatable, watertight enclosure 11 of conventional design. Typically, the enclosure is a sealed tube having a diameter of about 3–8 inches and an overall length of about 39 inches. A flotation collar 12 is provided near the top of the enclosure 11 to facilitate floating and vertical orientation thereof.

Enclosed within the enclosure 11 is an HF transceiver 13 and spread spectrum modulation and demodulation circuitry 14. These two components are coupled together in a conventional manner such that signals transmitted or recieved by the transceiver 13 are either modulated or demodulated, as the case may be, by means of conventional spread spectrum encoding. Typical of such spread spectrum encoding which may be adapted for use in the present invention is one described in U.S. Pat. No. 4,291,409 entitled "Spread Spectrum Communications Method and Apparatus," issued to Weinberg et al. However, spread spectrum modulation techniques are generally well-known in the art, and as such, there are many other modulation techniques available for use with the present invention.

The HF transceiver 13 is a conventional high frequency (HF) surface wave or sky wave transceiver operating in the 2–30 megahertz frequency band. Surface wave propagation permits propagation over the ocean surface to a distance of about 1000 miles. The surface wave transceiver is wideband and supports large spread spectrum bandwidths, as is well known in the art. HF sky wave transmission propagates over a very long range, up to 2000 miles, using ionospheric reflection. Both of these transmission modes are excited by a vertically polarized antenna, such as a whip or quarter wave monopole antenna. A general understanding of ionospheric radio propagation and HF radio transmission in particular may be had from a reading of the book entitled "Ionospheric Radio Propagation," edited by Kenneth Davies, and published by the National Bureau of Standards (1965).

Accordingly, housed within the enclosure 11 is an antenna 15, shown in two configurations: an extendible whip antenna 15a and a quarter wave monopole antenna 15b. The extendible whip antenna 15a may be a short vertical wire antenna or quarter wave vertical wire. The whip antenna 15a protrudes and is erected through a sealed O-ring, for example, or may be erected using an inflatable bladder arrangement within a nest of short antenna sections, similar to an automobile antenna. The quarter wave monopole antenna 15b is an erectable antenna comprising a balloon-like lifting body 17 which is inflated by hydrogen, or helium, or the like, in response to a trigger signal provided by the surface sensor. The lifting body 17 raises the quarter wave monopole antenna 15b to a height of about 60 feet above the surface of the ocean to permit surface wave transmission and reception. The lifting body 17 is shaped so as to maintain the antenna 15b in a relatively vertical orientation in low wind conditions. The antennas 15a, 15b are coated with a hydrophobic coating, for example, to mitigate the effects of wetting by sea water or rain.

The use of spread spectrum modulation and demodulation encoding minimizes multipath interference caused by sky wave interference due to reflections from different ionosphere layers, or from interference between co-channel users of the system. In addition, use of spread spectrum encoding limits the detectability of the transmitted signal by potential intercept receivers.

With reference to FIG. 2, it illustrates a variety of operational embodiments of the HF communications buoy of the present invention. In particular, a first implementation envisioned for the present invention is that of an HF, spread spectrum terminal which transmits signals from its location on the surface of the ocean to a remote terminal 33 located over the horizon. This is illustrated by means of the transmission path 30 having the elongated dashed lines and reflecting from an ionosphere layer 22 and path 34. This embodiment envisions the buoy 10 employed as a distress buoy, for example.

The buoy 10 includes a sensor 18 (FIG. 1) which senses when the buoy is floating on the surface of the ocean, and which provides a signal which triggers the deployment of the antenna 15. The sensor 18 may be an immersion sensor if the buoy is deployed from a flying or surface vehicle, or a surface sensor if the buoy 10 is deployed from a submerged vehicle 32.

A second embodiment is substantially as just described, but a submerged vehicle 32 has released the buoy 10 and uses it to transmit or receive signals to or from the remote terminal 33 by way of HF sky wave propagation over transmission path 30 and/or 34. In order to accomplish this, the buoy 10 includes underwater communication circuitry 23 coupled to the transceiver 13 for providing a communication link to the submerged vehicle 32. This provides a means by which the submerged vehicle can utilize the HF communications apparatus to communicate to the distant terminal 33. Such a communications path is shown in FIG. 2 as a tether 25 coupled between the submerged vessel and the buoy 10.

A third embodiment envisions that the submerged vehicle 32 has released the buoy 10 and uses it to transmit or receive signals to or from the remote terminal 33 by way of a network of substantially similar buoys 10 using HF surface wave propagation. This embodiment is illustrated by means of two buoys 10, 10a transmitting by way of a transmission path 34 identified by the short dashed lines from the buoy 10 coupled to the submerged vehicle 32 and the remote terminal 33.

A fourth embodiment involves the use of the network of similar HF spread spectrum surface wave buoys identified by buoys 10, 10a, 10b interconnected by transmission path 34, and identified by the short dashed line, and whereupon an airborne vehicle 36 transmits signals to a locally available buoy 10b by way of transmission path 38, and the HF surface wave link is employed to send these signals to either the submerged vehicle 32 or to the remote terminal 33.

A fifth embodiment involves the use of an airborne microwave transceiver 24 (FIG. 1) located at the end of the erectable wire antenna 15b and housed within the lifting body 17. This microwave transceiver 24 may be employed to permit direct line of sight communications between the airborne vehicle 36 and the buoy 10 by way of transmission path 39. Subsequent communications from the buoy 10 are accomplished by means of any of the HF spread spectrum surface or sky wave links shown in FIG. 2.

A sixth embodiment involves the utilization of buoys 10 disposed in holding or "parking" locations, to be released upon timed or commanded intervals, thereby establishing connectivity over extended periods. Buoy 10c is deployed from its location on the ocean floor, for example, as required to support desired communications missions.

Thus there has been described a new and improved a high frequency (HF) networkable communications buoy that employs HF surface wave and sky wave communication and spread spectrum modulation to suppress multipath fading and to decrease the detectability of transmitted signals.

It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. Apparatus for communicating from an ocean surface to compatible communication apparatus located beyond the horizon, the apparatus comprising:
    a water-tight floatable enclosure having sensor means coupled thereto for sensing when the enclosure is floating on the surface of the ocean, the sensor means adapted to provide a signal after the enclosure is floating on the surface of the ocean that triggers deployment of an antenna means;
    HF communications transceiver means disposed within the enclosure capable of transmitting and receiving signals employing high frequency band propagation;
    the transceiver means further comprising spread spectrum modulation and demodulation means for modulating transmitted signals utilizing spread spectrum modulation and for demodulating received signals encoded by means of spread spectrum modulation to suppress multipath fading and decrease the probability of undesired detection of transmitted signals; and
    antenna means coupled to the transceiver means for supporting the transmission and reception of the high frequency spread spectrum modulated signals.

2. The apparatus of claim 1 wherein the sensor means comprises an immersion sensor.

3. The apparatus of claim 1 wherein the sensor means comprises a surface sensor.

4. Communication apparatus for a vehicle submerged below the surface of a body of water, said communication apparatus comprising:
   a water-tight floatable enclosure adapted to be launched from the submerged vehicle;
   a tether containing an optical fiber operatively linked between the submerged vehicle and the floatable enclosure;
   a surface sensor coupled to the floatable enclosure adapted to provide a signal;
   a flexible wire antenna deployable from the enclosure;
   an inflatable aerodynamic lifting body coupled to one end of the wire antenna for erecting the wire antenna to a predetermined height above the water surface, the lifting body being inflatable with a lighter-than-air gas in response to the signal from the surface sensor, the lifting body being aerodynamically shaped to provide lift in the presence of wind;
   a radio transceiver adapted to operate in the high frequency band disposed in the floatable enclosure and being operatively coupled to the optical fiber and to the wire antenna; and
   spread spectrum modulation and demodulation means operatively incorporated in the radio transceiver for suppressing multipath fading and decreasing the probability of detection.

5. The communication apparatus of claim 4 wherein the wire antenna is coated with a hydrophobic coating to mitigate the effects of wetting.

6. Apparatus for communicating from the surface of a body of water to compatible communication apparatus located beyond the horizon, said apparatus comprising:
   a water tight floatable enclosure having a surface sensor coupled thereto, the surface sensor adapted to provide a signal;
   a flexible wire antenna deployable from the enclosure;
   an inflatable aerodynamic lifting body coupled to one end of the wire antenna for erecting the wire antenna to a predetermined height above the surface of the water, the lifting body being inflatable with a lighter-than-air gas in response to the signal from the surface sensor, the lifting body being aerodynamically shaped to provide lift in the presence of wind;
   a radio transceiver adapted to operate in the high frequency band disposed in the floatable enclosure and operatively coupled to the wire antenna; and
   spread spectrum modulation and demodulation means operatively incorporated in the radio transceiver for suppressing multipath fading and decreasing the probability of detection.

7. The apparatus of claim 6 wherein the wire antenna is coated with a hydrophobic coating to mitigate the effects of wetting.

8. Apparatus for communicating from the surface of a body of water to compatible communication apparatus located within radio line-of-sight, said apparatus comprising:
   a water-tight floatable enclosure;
   a surface sensor coupled to the floatable enclosure adapted to provide a signal;
   a flexible wire cable deployable from the enclosure;
   an inflatable aerodynamic lifting body coupled to one end of the flexible wire cable for lifting the wire cable to a predetermined height above the water surface, the lifting body being inflatable with a lighter than air gas in response to the signal from the surface sensor, the lifting body being aerodynamically shaped to provide lift in the presence of wind; and
   a microwave transceiver disposed on the inflatable aerodynamic lifting body and coupled to the flexible wire cable for providing line-of-sight microwave radio communications.

9. The apparatus of claim 8 wherein the microwave transceiver incorporates spread spectrum modulation and demodulation means to decrease the probability of detection.

* * * * *